United States Patent
Saito et al.

(10) Patent No.: US 6,792,746 B2
(45) Date of Patent: Sep. 21, 2004

(54) SEPARATED CORE ENGINE TYPE TURBOFAN ENGINE

(75) Inventors: Yoshio Saito, Kiyose (JP); Masanori Endo, Inagi (JP); Yukio Matsuda, Kodaira (JP); Nanahisa Sugiyama, Kashiwa (JP); Takeshi Tagashira, Higashikurume (JP)

(73) Assignee: National Aerospace Laboratory of Japan, Tokyo (JP)

( * ) Notice: Subject to any disclaimer, the term of this patent is extended or adjusted under 35 U.S.C. 154(b) by 65 days.

(21) Appl. No.: 10/341,390

(22) Filed: Jan. 14, 2003

(65) Prior Publication Data

US 2003/0131585 A1 Jul. 17, 2003

(30) Foreign Application Priority Data

Jan. 16, 2002 (JP) ........................................ 2002-008072

(51) Int. Cl.[7] ........................... F02K 11/00; F02K 3/00; F02K 7/00; F02K 9/00; F02K 9/74
(52) U.S. Cl. ...................... 60/224; 60/226.1; 60/39.15
(58) Field of Search ................................ 60/224, 226.1, 60/263, 39.15, 39.183, 785, 782, 791

(56) References Cited

U.S. PATENT DOCUMENTS

| 2,940,689 | A | * | 6/1960 | Howell | 244/12.3 |
|---|---|---|---|---|---|
| 3,018,034 | A | * | 1/1962 | Ferri | 60/269 |
| 3,645,476 | A | * | 2/1972 | Haberkorn | 244/12.3 |
| 3,739,580 | A | * | 6/1973 | Bland et al. | 60/204 |
| 3,972,490 | A | * | 8/1976 | Zimmermann et al. | 244/12.3 |
| 4,519,562 | A | * | 5/1985 | Willis | 244/207 |
| 6,134,876 | A | * | 10/2000 | Hines et al. | 60/791 |
| 6,415,597 | B1 | * | 7/2002 | Futamura et al. | 60/224 |
| 6,543,718 | B2 | * | 4/2003 | Provost | 244/12.4 |
| 2002/0189230 | A1 | * | 12/2002 | Franchet et al. | 60/204 |

FOREIGN PATENT DOCUMENTS

JP 5-87655 12/1993

* cited by examiner

Primary Examiner—Justine R. Yu
Assistant Examiner—William H. Rodriguez
(74) Attorney, Agent, or Firm—Westerman Hattori Daniels & Adrian, LLP

(57) ABSTRACT

A low-noise separated core engine type turbofan engine is provided in which noise generated by a control propulsion device is reduced by using high pressure air as the working fluid of a turbine for driving a control fan used in the attitude control of the airframe. A control fan 17 of a separated core engine type turbofan engine 1, which is comprised in a control propulsion device 4 provided for attitude control of the aircraft, is driven by an air turbine 19 which uses as working fluid high pressure air compressed by a compressor 6 of the core engine 2 and supplied through a duct 10. The speed of the working fluid which is discharged from the control fan 17 and air turbine 19 is sufficiently low for attitude control and not as high as the speed of the working fluid which is discharged from a propulsion device 3 which is provided for thrust, and thus noise generated by the control propulsion device 4 can be reduced.

4 Claims, 2 Drawing Sheets

SEPARATED CORE ENGINE TYPE TURBOFAN ENGINE

BACKGROUND OF THE INVENTION

1. Field of the Invention

This invention relates to a separated core engine type turbofan engine comprising at least one core engine and at least one propulsion device, which is particularly suitable for use in a vertical take-off and landing aircraft.

2. Description of the Related Art

A conventional turbofan engine for use in a vertical take-off and landing aircraft is constituted by a fan, a compressor, a combustor, and a turbine, wherein the turbine is driven by using high temperature combustion gas as working fluid produced in the combustor, and the fan is driven by the turbine. The aircraft hovers and advances by using discharge from the fan and discharge from the turbine, and attitude control of the aircraft is performed by blowing out high pressure air which is bled from the compressor from the vicinity of the wing tip and the vicinity of the front and rear of the airframe.

A conventional example of a turbofan engine for use in a vertical take-off and landing aircraft is disclosed in Japanese Patent Publication No. H5-87655. The turbofan engine disclosed in this publication is a separated core engine type turbofan engine constituted by at least one core engine comprising a compressor, a combustor, and a turbine, and at least one propulsion device which is separated from the core engine and comprises a fan driving combustor which is supplied with high pressure air from the core engine through a high pressure air duct, a turbine, and a fan which is driven by this turbine.

The separated core engine type turbofan engine disclosed in this publication is constituted such that the core engine and propulsion device are disposed and constituted separately, and therefore the propulsion device can be disposed in a desired position without the restriction of being disposed on the same axis as the fan axis and turbine axis. When a separated core engine type turbofan engine of this type is installed in an aircraft, for example, the degree of freedom may be increased and the desired object may be achieved. In order to blow out the high pressure air bled from the compressor during attitude control of an aircraft comprising this separated core engine type turbofan engine, however, the speed of the blown out air is high. As a result, a problem arises in that a large noise is produced when the aircraft is attitude controlled. Thus in this type of separated core engine type turbofan engine, there remains scope for further improvements in relation to noise reduction during attitude control of the aircraft.

The problem that is to be solved in the separated core engine turbofan engine is therefore to reduce the speed of the air which is blown out for attitude control of the aircraft.

SUMMARY OF THE INVENTION

An object of this invention is to provide a separated core engine type turbofan engine in which noise generated during aircraft attitude control may be reduced by decreasing the speed of air which is blown out of a separated core engine type turbofan engine for the purposes of aircraft attitude control.

In order to solve the aforementioned problems, a separated core engine type turbofan engine according to this invention is constituted by at least one core engine comprising a compressor and a combustor and turbine for driving this compressor, at least one propulsion device disposed separately from the core engine and supplied with high pressure air from the core engine for driving a thrust fan, and at least one control propulsion device for controlling an aircraft and comprising an air turbine disposed separately from the core engine and driven by high pressure air supplied by the core engine, and a control fan which is driven by the air turbine.

According to the separated core engine type turbofan engine thus constituted, the turbine is driven by high temperature combustion gas produced in the combustor in at least one of the core engines, and the compressor is driven by the output of the turbine. A part of the air compressed by the compressor is transmitted to the combustor, and fuel injected into the combustor is mixed with the air and burned. The remaining part of the high pressure air compressed by the compressor of the core engine is supplied to at least one propulsion device and at least one control propulsion device which are disposed separately to the core engine. In the propulsion device, the thrust fan is driven using high pressure air supplied by the core engine, and thus thrust is obtained. In the control propulsion device, the air turbine is driven using high pressure air supplied by the core engine as working fluid, and the control fan is driven by the air turbine. The control propulsion device is provided separately to the propulsion device used for thrust in a position at which control blowout is necessary, and therefore the speed of the air necessary for aircraft control can be set at a low level such that during attitude control of the aircraft, the noise generated by air blowout for control can be reduced.

In this separated core engine type turbofan engine, the propulsion device may comprise a fan driving combustor supplied with high pressure air from the core engine, and a fan driving turbine for driving the propulsion fan. In the propulsion device, the fan driving combustor mixes the high pressure air supplied from the core engine with fuel and burns this fuel. The fan driving turbine is driven with the produced combustion gas as working fluid, and the output of the fan driving turbine drives the thrust fan such that thrust is obtained.

When a plurality of core engines is provided in this separated core engine type turbofan engine, the high pressure air from the core engines may be distributed among and supplied to at least one of the propulsion devices or at least one of the control propulsion devices via a common high pressure air control device for controlling the temperature, pressure, and so on of the high pressure air. When a system constitution comprising a plurality of core engines and a plurality of propulsion devices is provided, the temperature, pressure, flow rate, and so on of the high pressure air from the plurality of core engines are controlled by the common high pressure air control device if irregularities appear in the amounts thereof, and the high pressure air required by the respective propulsion devices and control propulsion devices is controlled by the high pressure air control device to be distributed among and supplied to at least one of the propulsion devices or at least one of the control propulsion devices.

In this separated core engine type turbofan engine, at least a part of the propulsion engines is used for vertical take-off and landing, and therefore this invention can be applied to a vertical take-off and landing aircraft. In other words, when the separated core engine type turbofan engine is applied to a vertical take-off and landing aircraft, at least one part of the propulsion devices may be used for vertical take-off and landing, and the remaining propulsion devices may be used as front and rear direction propulsion devices.

DESCRIPTION OF THE PREFERRED EMBODIMENTS

Figure 1:
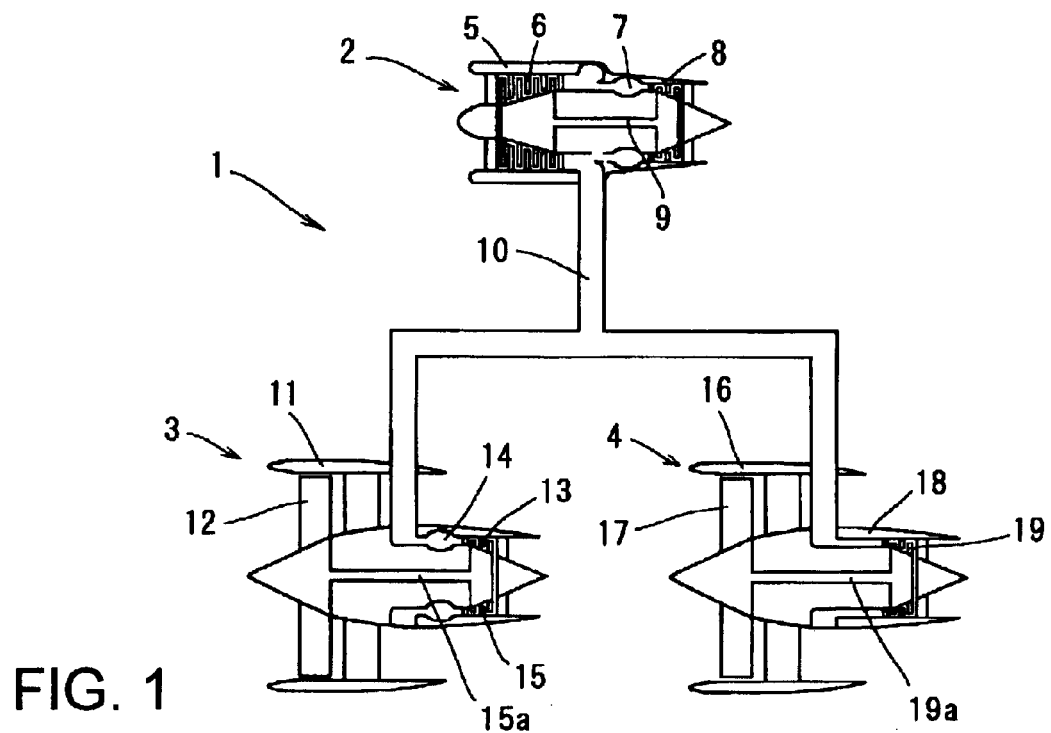
FIG. 1 is a schematic sectional diagram illustrating an embodiment of a separated core engine type turbofan engine according to this invention.

Embodiments of the separated core engine type turbofan engine according to this invention will now be described on the basis of the attached drawings. FIG. 1 is a schematic sectional diagram illustrating an embodiment of a separated core engine type turbofan engine according to this invention.

The separated core engine type turbofan engine 1 shown in FIG. 1 is constituted by a core engine 2, a propulsion device 3 which is disposed separately from the core engine 2, and a control propulsion device 4 which is also disposed separately from the core engine 2. The core engine 2 comprises inside a case 5 a compressor 6, a combustor 7 for burning air fuel mixture in which air compressed by the compressor 6 is mixed with fuel, and a turbine 8 which is driven by combustion gas serving as working fluid which is produced in the combustor 7. The turbine 8 drives the compressor 6 via a shaft 9. The individual elements of the core engine 2 are well-known and further detailed description thereof shall be omitted here. One part of the air which is compressed by the compressor 6 is led into the combustor 7 and turbine 8 and used in the driving of the compressor 6 by the turbine 8. The remaining high pressure air is led into a duct 10 to be used by the propulsion device 3 and control propulsion device 4, to be described herein below.

The propulsion device 3 comprises a thrust fan 12 inside a shroud 11, a fan driving combustor 14 disposed inside a case 13 which is concentric with the thrust fan 12, and a fan driving turbine 15. The thrust fan 12 and fan driving turbine 15 are linked by a shaft 15a. The duct 10 is connected to the fan driving combustor 14. The high pressure air supplied from the core engine 2 through the duct 10 is mixed with fuel and burned in the fan driving combustor 14 of the propulsion device 3, and the combustion gas produced by combustion of the fuel in the fan driving combustor 14 flows into the fan driving turbine 15 as working fluid to drive the fan driving turbine 15. The output running torque of the fan driving turbine 15 causes the thrust fan 12 to rotate, thereby creating thrust.

The control propulsion device 4 comprises a control fan 17 inside a shroud 16 and an air turbine 19 for driving the control fan 17 which is disposed inside a case 18 which is concentric with the control fan 17. The control fan 17 and air turbine 19 are linked by a shaft 19a. Well-known objects may be used as the individual elements of the propulsion device 3 and control propulsion device 4. The duct 10 is connected to the air turbine 19, and the air turbine 19 is driven by high pressure air serving as working fluid which is supplied to the air turbine 19 from the core engine 2 through the duct 10. The running torque of the air turbine 19 passes through the shaft 19a to cause the control fan 17 to rotate and produce control thrust. The turbine for driving the control fan 17 is the air turbine 19 which uses a part of the high pressure air compressed by the compressor 6 of the core engine 2 as working fluid rather than combustion gas. Hence, since there is no combustor in the fan driving portion, the constitution thereof can be simplified and reduced in size. Further, since there is no need to use expensive heat-resistant material for the turbine, the control propulsion device 4 can be constructed at a reasonable cost. Moreover, since combustion control is unnecessary, operational control of the attitude control propulsion device 4 becomes easy.

As described above, in the separated core engine type turbofan engine 1, the control propulsion device 4 for obtaining controlling thrust is constituted separately from the propulsion device 3 for obtaining propulsion thrust and disposed in the necessary position, and therefore the speed of the air which is supplied from the core engine 2 and blown out from the control fan 17 in order to obtain the necessary thrust in the control propulsion device 4 may be lower than the speed at which the high pressure air bled from the compressor is blown out. Accordingly, when the separated core engine type turbofan engine 1 is applied in an aircraft, for example, the noise which accompanies the blowout of air which is discharged from the control fan 17 and air turbine 19 upon operation of the control propulsion device 4 for attitude control of the aircraft can be reduced.

Figure 2:
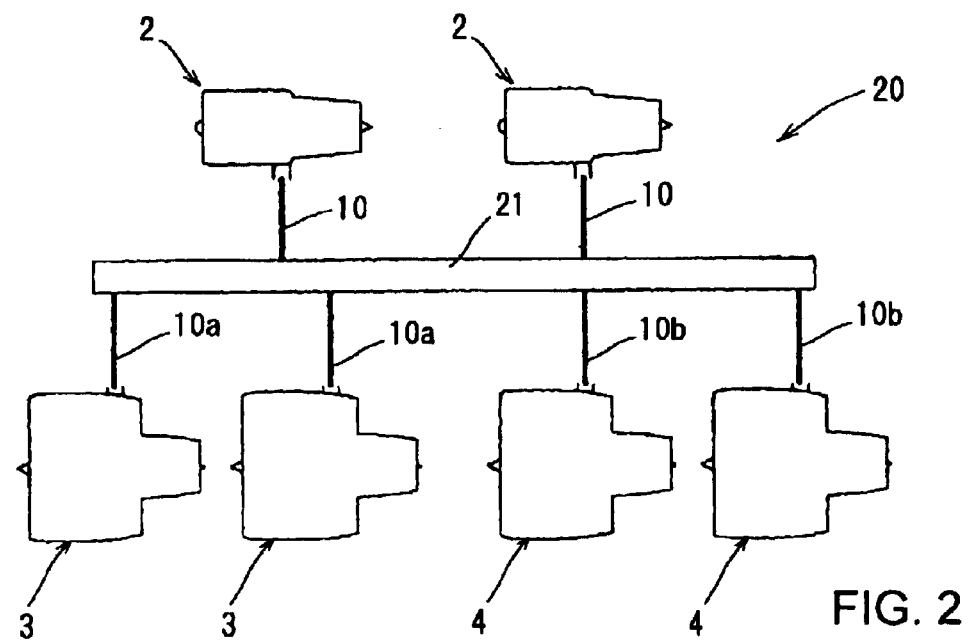
FIG. 2 is a schematic diagram illustrating another embodiment of a separated core engine type turbofan engine according to this invention.

FIG. 2 is a schematic view illustrating another embodiment of the separated core engine type turbofan engine according to this invention. The separated core engine type turbofan engine 20 shown in FIG. 2 comprises two core engines 2, two propulsion devices 3, and two control propulsion devices 4. The ducts 10 which extend from the core engines 2, 2 are connected to a common high pressure air control device 21. The high pressure air control device 21 controls the pressure, temperature, flow rate, and so on of the high pressure air supplied from the core engines 2, 2, and the high pressure air thus controlled is supplied to each propulsion device 3 and control propulsion device 4 through respective ducts 10a, 10b. If the pressure, temperature, flow rate and so on of the high pressure air from the core engines 2, 2 differ, the amounts thereof are adjusted by the common high pressure air control device 21 such that the high pressure air is supplied to the propulsion devices 3 and control propulsion devices 4 having been controlled to the necessary amounts. Of course the high pressure air may be supplied to the propulsion devices 3 and control propulsion devices 4 directly from the core engines 2, 2 rather than through the high pressure air control device 21. Further, the number of core engines 2, propulsion devices 3 and control propulsion devices 4 is not limited to the number in the example in the drawing as long as at least one of each is provided.

Figure 3:
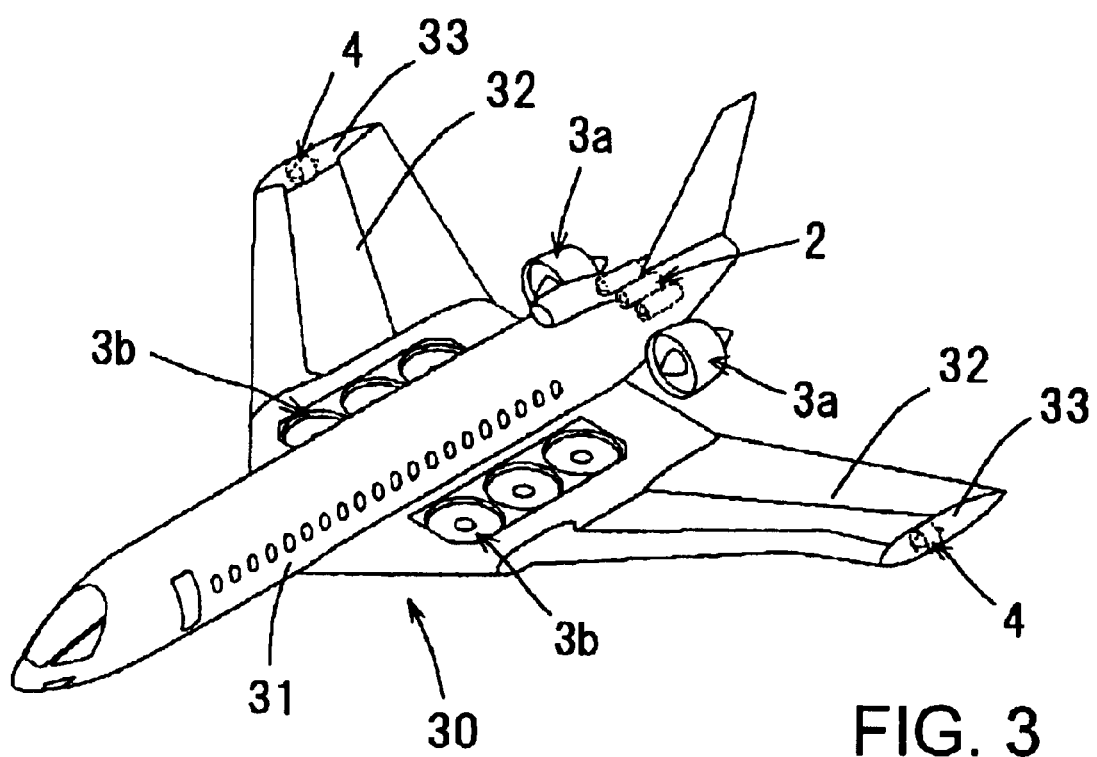
FIG. 3 is a schematic perspective view illustrating an example of a vertical take-off and landing aircraft to which the separated core engine type turbofan engine according to this invention has been applied.

FIG. 3 is a schematic perspective view illustrating an example of the separated core engine type turbofan engine according to this invention applied to a vertical take-off and landing aircraft. In the vertical take-off and landing aircraft 31 shown in FIG. 3, the separated core engine type turbofan engine 30 comprises three core engines 2 disposed at the rear of the fuselage of the vertical take-off and landing aircraft 31, and two propulsion devices 3a serving as thrust fans, disposed at the rear of the fuselage. Particularly in this example, three propulsion devices 3b serving as vertical take-off and landing fans are disposed on each side of the fuselage to make a total of six, with the fan axis facing a direction perpendicular to the airframe. Thus the propulsion devices 3 may be used both for thrust and for take-off and landing. Also in the example in FIG. 3, control propulsion devices 4, 4 comprising attitude control fans are installed on the wing tip portions 33, 33 of the respective main wings 32, 32 for attitude control of the aircraft. The noise which is generated by the control propulsion devices 4, 4 spreads in a wide range around the vertical take-off and landing aircraft 31 due to the installment positions thereof, but by lowering the noise level of the control propulsion devices 4, 4, the effect of the noise can be reduced.

The separated core engine turbofan engine according to this invention is constituted by at least one core engine comprising a compressor, and a combustor and turbine for driving this compressor, at least one propulsion device disposed separately from the core engine, and at least one control propulsion device for controlling the aircraft. The control propulsion device comprises a fan driving air turbine which is driven by high pressure air supplied by the core engine, and a control fan which is driven by the fan driving air turbine, and hence the speed of air which is blown out from the control fan and fan driving air turbine of the control propulsion device during attitude control of the aircraft can be reduced. As a result, the control propulsion device can be muffled and a separated core engine type turbofan engine with reduced noise during attitude control of the aircraft can be provided.

What is claimed is:

1. A separated core engine type turbofan engine, comprising:

at least one core engine comprising a compressor, and a combustor and turbine for driving said compressor;

at least one propulsion device disposed separately from said core engine and supplied with high pressure air from said core engine for driving a propulsion fan; and at least one control propulsion device for controlling an aircraft and comprising an air turbine disposed separately from said core engine and driven by high pressure air supplied by said core engine, and a control fan which is driven by said air turbine.

2. The separated core engine type turbofan engine according to claim 1, wherein said propulsion device comprises a fan driving combustor supplied with high pressure air from said core engine, and a fan driving turbine for driving said propulsion fan.

3. The separated core engine type turbofan engine according to claim 1, wherein said high pressure air from a plurality of said core engines is distributed among and supplied to at least one of said propulsion devices or at least one of said control propulsion devices via a common high pressure air control device controlling the temperature, pressure, and so on of said high pressure air.

4. The separated core engine type turbofan engine according to claim 1, which is applied to a vertical take-off and landing aircraft by using at least one part of said propulsion device for vertical take-off and landing.

* * * * *